US005412207A

United States Patent [19]

Micco et al.

[11] Patent Number: 5,412,207

[45] Date of Patent: May 2, 1995

[54] METHOD AND APPARATUS FOR ANALYZING A GAS SAMPLE

[75] Inventors: Alexander J. Micco, Lakewood; Donald G. Ellis; Norman W. Baer, both of Boulder, all of Colo.

[73] Assignee: Marquette Electronics, Inc., Milwaukee, Wis.

[21] Appl. No.: 133,592

[22] Filed: Oct. 7, 1993

[51] Int. Cl.[6] ........................ B01D 59/44; H01J 49/00

[52] U.S. Cl. .................................... 250/288; 250/292; 250/282

[58] Field of Search ............... 250/288, 251, 427, 292, 250/281, 282

[56] References Cited

U.S. PATENT DOCUMENTS

| | | | |
|---|---|---|---|
| 3,560,734 | 2/1971 | Barnett et al. | 250/292 |
| 3,895,231 | 7/1975 | Sodal et al. | 250/288 |
| 3,926,209 | 12/1975 | Sodal et al. | 137/487.5 |
| 3,996,464 | 12/1976 | Fletcher et al. | 250/289 |
| 4,008,388 | 2/1977 | McLafferty et al. | 235/151.35 |
| 4,018,241 | 4/1977 | Sodal et al. | 137/14 |
| 4,134,013 | 1/1979 | Evans et al. | 250/298 |
| 4,134,073 | 1/1979 | MacGregor | 328/63 |
| 4,689,574 | 8/1987 | Lim | 250/427 |
| 4,731,533 | 3/1988 | Vestal | 250/292 |
| 4,746,794 | 5/1988 | French et al. | 250/288 |
| 4,746,802 | 5/1988 | Kellerhals | 250/291 |
| 4,755,671 | 7/1988 | Freidland et al. | 250/298 |
| 4,769,540 | 9/1988 | Mitsui et al. | 250/288 |
| 4,816,685 | 3/1989 | Lange | 250/427 |
| 4,870,283 | 9/1989 | Taya | 250/396 |
| 4,947,041 | 8/1990 | Taya | 250/298 |
| 4,948,962 | 8/1990 | Mitsui et al. | 250/288 |
| 5,153,432 | 10/1992 | Devant et al. | 250/292 |

*Primary Examiner*—Bruce C. Anderson
*Attorney, Agent, or Firm*—Michael, Best & Friedrich

[57] ABSTRACT

A method and gas analysis system for a mass spectrometer including an ion pump for creating an internal vacuum within said mass spectrometer, an ionization chamber, an inlet passage through which a gas sample is introduced into the ionization chamber, valve means associated with the inlet passage for controlling the volume of gas sample introduced into the ionization chamber, a filament for introducing electrons into the ionization chamber whereby the electrons bombard the gas sample thus forming ions, an extractor plate positioned adjacent the ionization chamber and biased such that a proportion of ions and electrons are allowed to pass through the extractor plate, a quadrupole filter into which the ions and electrons are directed by the extractor plate, the quadrupole filter operative to permit a stream of ions with a pre-selected mass-to-charge ratio to pass through the filter and ions other than those having the pre-selected mass-to-charge ratio being separated from the stream of ions, means for directing electrons toward ions other than those having the pre-selected mass-to-charge ratio in the area of said quadrupole filter so that the electrons combine with the ions, a sensor for detecting the stream of ions passing through the quadrupole filter, and analyzing means connected with the sensor for analyzing the components of the gas sample.

31 Claims, 1 Drawing Sheet

METHOD AND APPARATUS FOR ANALYZING A GAS SAMPLE

FIELD OF THE INVENTION

The invention relates to a method and apparatus for analyzing a gas sample and, more particularly, to mass spectrometers utilizing quadrupole mass filters, or the like.

BACKGROUND OF THE INVENTION

Much of pulmonary physiology is based on the analysis of respiratory gases and the mass spectrometer has shown its usefulness as a high speed accurate gas analyzer. The mass spectrometer is an apparatus that separates charged particles (ions) according to their mass-to-charge ratios and determines the relative abundance of each type of ion present.

Mass spectrometers used in pulmonary applications generally include a sample-inlet assembly, an ionization chamber, a focusing lens, a mass filter in a filter chamber and a sensor, all housed in a low pressure vacuum envelope. Examples of such prior mass spectrometers are found in U.S. Pat. Nos. 4,008,388, issued to McLafferty et al., and 4,816,685, issued to Lange. The sample-inlet system captures the respiratory gas to be analyzed and directs it to the ionization chamber. A stream of electrons from a filament bombards the gas entering the ionization chamber and causes the gas molecules to lose electrons thereby producing positive ions. The ions alone are focused into a beam and accelerated into the filter chamber. The electrons are not allowed to pass into the filter chamber. In the filter chamber, the ion beam is sorted into its components on a mass-to-charge ratio by the mass filter.

In the filter chamber, a mass filter, as for example a quadrupole mass filter, is utilized to separate ions by their mass-to-charge ratios. The filter does so by the application of an electric and/or magnetic field. The filter is designed such that the ions of the molecule to be measured, for example preselected oxygen (M/e 32) ions, continue through the filter chamber and are collected and measured by the sensor. The remainder of the ions, for example the non-oxygen ions, remain in the filter and do not migrate to the sensor.

It is these remainder, or unselected, ions that do not migrate to the sensor that cause problems with the stability and sensitivity of the mass spectrometer. Under normal operation, these unselected ions contact the filter elements, pick up electrons from those elements to become neutralized, and eventually migrate from the filter and are removed from the filter chamber by the ion pump. However, continued operation can result in a build up of these unselected ions on the filter elements that in time creates a dielectric film which prevents the ions from picking up electrons from the elements. That film will eventually take on a charge of its own and interfere with operation of the filter, its stability and sensitivity. In the past, to retain its sensitivity and the stability of the mass spectrometer, the practice was to disassemble it and mechanically or chemically clean the filter elements to remove that film. This disassembly has the obvious disadvantage in that it causes down time of the mass spectrometer and additional expense along with reduced sensitivity and stability of the mass spectrometer before the disassembly.

SUMMARY OF THE INVENTION

The invention provides a method and apparatus for analyzing a gas sample in a mass spectrometer. The mass spectrometer system includes a pump for creating a vacuum envelope within the mass spectrometer and includes an ionization chamber. An inlet passage is provided through which a gas sample is introduced into the ionization chamber. A valve means is associated with the inlet passage for controlling the volume of gas sample introduced into the ionization chamber. A filament introduces electrons into the ionization chamber whereby the electrons bombard the gas sample thus forming ions. An extractor plate is positioned adjacent the ionization chamber and biased such that a proportion of ions and electrons are allowed to pass through the extractor plate and into a quadrupole filter. The quadrupole filter permits a stream of ions with a preselected mass-to-charge ratio to pass through the filter. Ions other than those having that pre-selected mass-to-charge ratio separate from the stream of ions and contact the filter elements. The electrons which were allowed to pass to the quadrupole filter migrate to the ions other than those having the pre-selected mass-to-charge ratio which had contacted the quadrupole filter and combine with the ions on the filter elements. These ions are thereby neutralized and are eventually removed from the filter by the pump. A magnet collects electrons that did not combine with any ion. A sensor detects the stream of ions passing through the quadrupole filter. Finally, an analyzing means is connected with the sensor for analyzing the components of the gas sample. Preferably the filament in the ionization chamber and the direction of migration of the electrons and ions generated (the ion/electron beam) in the ionization chamber are co-axial with the quadrupole filter and the principal direction of flow in the filter of the ions of preselected mass to charge ratio.

It is one feature of the invention to provide a mass spectrometer apparatus for analyzing a gas sample.

It is another feature of the invention to provide a mass spectrometer that maintains its sensitivity and operational integrity of gas sample analysis on a continuous basis.

It is another feature of the invention to provide a mass spectrometer that continually neutralizes ions remaining in the filter of the mass spectrometer.

It is another feature of the invention to provide a mass spectrometer that utilizes electrons in the filter of the mass spectrometer to neutralize ions remaining in the filter.

It is another feature of the invention to provide a method for analyzing a gas sample in a mass spectrometer that maintains the sensitivity and operational integrity of the filter of the mass spectrometer.

It is another feature of the invention to provide a method for neutralizing a mass spectrometer filter of undesired ions that utilizes electrons in the filter of the mass spectrometer.

Other features and advantages of the invention will become apparent to those of ordinary skill in the art upon review of the following drawings, detailed description, and claims.

Figure 1:
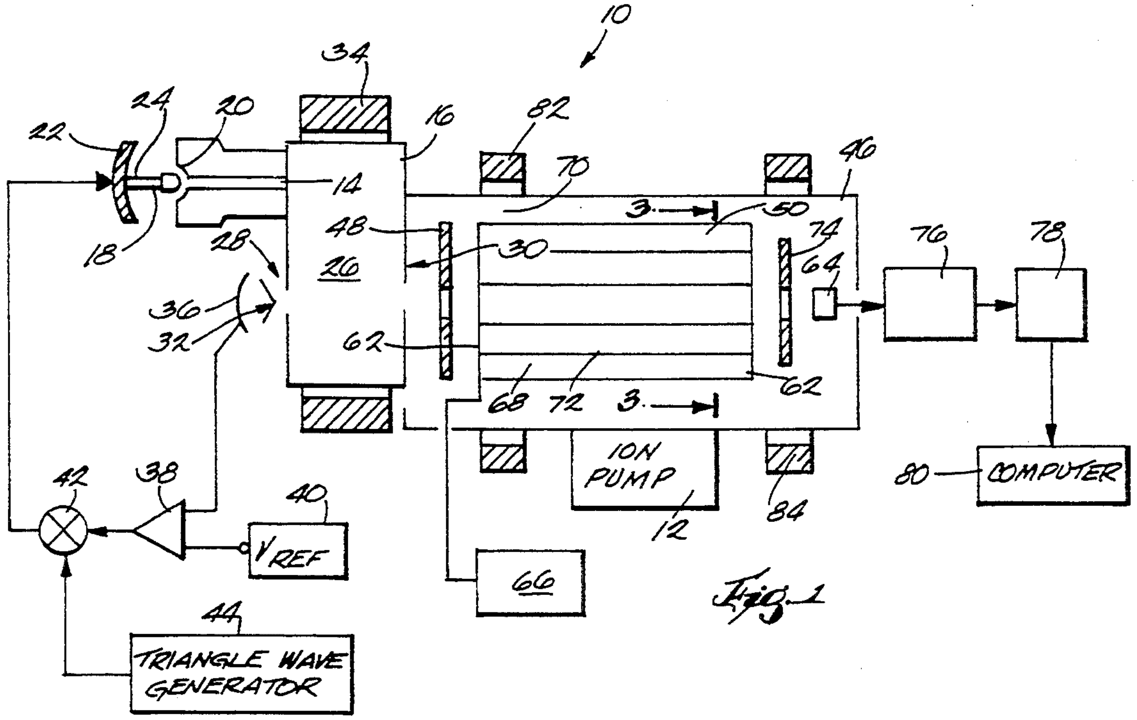
FIG. 1 is a simplified schematic representation of the mass spectrometer system embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Referring to the drawings, there is shown in FIG. 1 a mass spectrometer 10 embodying the invention. Mass spectrometers operate on the basis of an internal vacuum. To this end, the illustrated mass spectrometer 10 includes a means for creating an internal vacuum within the mass spectrometer such as an ion pump 12.

The mass spectrometer 10 further includes an inlet passage 14 through which a gas sample enters the mass spectrometer 10. The inlet passage 14 is formed in a portion of the spectrometer housing 16 and the volume of gas sample entering the mass spectrometer 10 is controlled by a valve means associated with the inlet passage 14. The valve means can include a conventional valve assembly for controlling entry into the inlet passage 14. Preferably, the valve means includes a sapphire-tipped needle valve 18 in association with a nickel seat 20 and a piezoelectric crystal 22. The sapphire-to-nickel seal of the inlet passage 14 is helium tight thus, the mass spectrometer 10 is able to retain its internal vacuum for extended periods of time. The end 24 of the needle valve 18 opposite the jeweled tip is mounted on the piezoelectric crystal 22. The piezoelectric crystal 22 flexes in response to an applied electric signal. The operation of the needle valve 18 and the piezoelectric crystal 22 to control the intake of the gas sample into the mass spectrometer 10 will be described further hereinafter.

The inlet passage 14 opens into a closed ionization chamber 26 that is small in size, preferably having a volume of, for example, 0.2 cc. The ionization chamber 26 has two orifices 28 and 30 communicating with the internal vacuum. Because the ionization chamber 26 communicates with the internal vacuum through only the two small orifices 28 and 30, the pressure in the ionization chamber 26 is typically one or two orders of magnitude higher than the pressure elsewhere in the mass spectrometer 10. This enables a higher ion output from the ionization chamber 26 at a lower system pressure, thus reducing the pumping requirements for creating the internal vacuum in the mass spectrometer 10. The closed ionization chamber 26 makes possible the use of an ion pump 12 which is smaller than that used by mass spectrometers utilizing open ionization chambers. Further, the closed ionization chamber 26 contributes directly to increasing the response speed of the mass spectrometer 10 since the small ionization chamber volume of, for example, 0.2 cc washes out a given gas sample more rapidly thus enabling a more rapid response to changes in gas composition by the mass spectrometer 10.

A filament 32 is located outside the ionization chamber 26 and is heated in a conventional manner to emit electrons. The emitted electrons travel through the first orifice 28 into the ionization chamber 26. The first orifice 28 and the filament 32 are arranged in line with the axis of the quadrupole filter, which will be described hereinafter. A magnet 34 located outside the ionization chamber 26 produces an axial magnetic field which serves to focus the electrons into a beam within the ionization chamber 26. This greatly enhances the efficiency of the ionization by increasing the path length of the electrons. More particularly, the axis of the magnetic field is co-axial with the quadrupole filter. Thus, the filament 32 and the axis of the magnetic field generated by magnet 34 are co-axial with the axis of the quadrupole filter. In operation, the gas sample enters the ionization chamber 26 through the inlet passage 14 and once in the ionization chamber 26, the gas sample is bombarded by the electron beam so as to cause the molecules of the gas sample to become ionized.

A concentrating collector 36 is located behind the filament 32. The collector 36 is biased, in a conventional manner, more negative than the filament 32 and has two functions. First, the collector 36 serves as an electron focusing element focusing electrons into the ionization chamber 26. Second, the collector 36 serves as an ion collector for the ions leaving the ionization chamber 26 via the first orifice 28. This second function will be described more fully hereafter.

The newly formed ions can pass out of the ionization chamber 26 either via the first orifice 28 or the second orifice 30. The ions that pass out of the ionization chamber 26 via the first orifice 28 are representative of the pressure in the ionization chamber 26. Thus, the volume of ions exiting the first orifice 28 can be used as a control signal to maintain a desired, preferably constant, pressure within the ionization chamber 26. The rate of flow of the sample gas into the ionization chamber 26 is critical for the accurate measurement of the gases to be analyzed, in an anesthesiology application these are respiratory gases. The total pressure within the ionization chamber 26 needs to be maintained at a constant or predetermined level to thereby maintain the desired rate of ion flow. The movement of the needle valve 18 or, in other words, its position relative to the nickel seat 20, determines the leak rate of the gas sample into the ionization chamber 26. That movement and/or position is a function of a potential applied to the piezoelectric crystal 22 by an inlet control means. An input signal proportional to and representative of the total pressure within the ionization chamber 26 provides an input to the inlet control means. The output signal from the inlet control means is coupled to the piezoelectric crystal 22 thus establishing a servo-controlled motion of the needle valve 18 so as to maintain a constant pressure in the ionization chamber 26.

Figure 2:
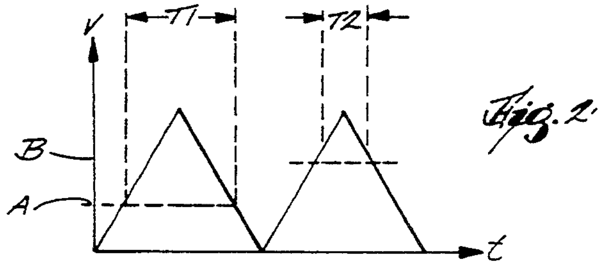
FIG. 2 is a graphical representation of a voltage versus time waveform that is part of an inlet control means of the mass spectrometer.

More specifically, the stream of ions exiting the ionization chamber 26 via the first orifice 28 are detected by the collector 36 located behind the filament 32. That stream of ions is determined by and representative of the pressure in the ionization chamber 26. Thus, the ion current collected by the collector 36 is representative of the pressure in the ionization chamber 26 and is used as the control signal to maintain a constant pressure in the ionization chamber 26. The current flow out of the collector 36 provides the input signal for the inlet control means. The inlet control means preferably includes the following conventional components; a comparator 38, a reference voltage generator 40, a summing circuit 42 and a triangular wave generator 44. The input signal from the collector 36 provides one input to the comparator 38 for comparison against a second input or reference voltage from the reference voltage generator 40. The resulting DC level output from the comparator 38 is introduced into the summing circuit 42 which also receives an input from the triangular wave generator 44. The time of actuation of the piezoelectric crystal 22 is thus a function of the combination of both the amount of activity from the ionization chamber 26 and the instantaneous output of the triangular wave generator 44. This is graphically illustrated in FIG. 2 wherein A is a DC level representing the pressure of the ionization chamber 26 at one point in time which combines in the summing circuit 42 with the triangular waveform from the triangular wave generator 44 to produce an on-time pulse of T1. The output signal of the summing circuit 42 is fed to the piezoelectric crystal 22. The piezoelectric crystal 22 responds to the signal by deforming and forcing the needle valve 18 to open the inlet passage 14 thus allowing a gas sample to flow into the ionization chamber 26 for a period of T1. A higher DC level B from the comparator 38 representing a higher pressure level in the ionization chamber 26 combines with the generated sawtooth pulse in the summing circuit 42 to produce an on time pulse of T2. Because the pressure was higher in the ionization chamber 26 during the later measurement of B, the piezoelectric crystal 22 will receive a signal such that the needle valve 18 will keep the inlet passage 14 open for a shorter amount of time (T2).

It should be noted that if no output signal is applied to the piezoelectric crystal 22, the needle valve 18 will fully occlude the inlet passage 14. Modulation of the inlet passage 14 is effected by a level-shifted triangular wave signal rather than a square wave signal since the triangular wave signal has proven to extend the life of the piezoelectric crystal 22 and the nickel seat 20.

In addition to exiting the ionization chamber 26 via the first orifice 28, ions also exit via the second orifice 30. Ions leaving the ionization chamber 26 exit via the second orifice 30 are accelerated towards a filter chamber 46 by an extractor plate 48 which creates an electric bias. The extractor plate 48 is positioned adjacent the second orifice 30 and is biased in a conventional manner to allow a certain proportion of ions to pass into the filter chamber 46. The voltage of the extractor plate 48 is preferably selected relative to the voltage on the filament 32 such that a certain proportion of, but not all of, the electrons are also allowed to pass into the filter chamber 46. The voltage on the filament and the extractor plate could be equal and thereby allow all of the electrons into the filter, but this is not the best operation so, preferably, the voltage on the extractor plate is more negative than that on the filament. More particularly, the voltage on the extractor plate should exceed that on the filament, in a negative sense, by 2–4 volts but not more than 5 volts at which point the extractor plate will tend to turn back too many, if not all, electrons. Preferably, and as an example, if the potential of filament 32 is approximately −50 volts, the potential of the extractor plate 48 will be approximately −52.5 volts. This will allow both ions and electrons to pass into the filter chamber 46, some of the electrons which are present will be turned back at the extractor plate.

Figure 3:
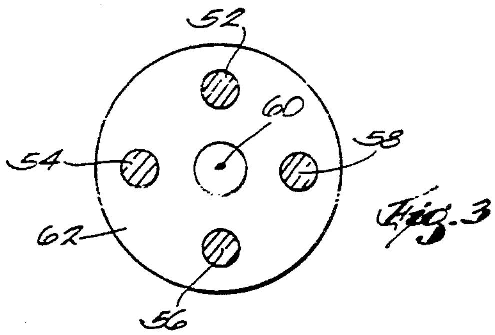
FIG. 3 is a plan view of a retaining plate of the mass spectrometer.

The filter chamber 46 contains a filter apparatus such as a conventional quadrupole mass filter 50 consisting of four parallel rods 52, 54, 56 and 58 that are equidistant from a longitudinal axis 60 of the quadrupole filter 50. The rods 52, 54, 56 and 58 are retained in this orientation by a pair of retainer plates 62 (FIG. 3), one plate 62 at each end of the rods 52, 54, 56 and 58. The quadrupole filter 50 operates on the principle that charged particles of a given mass can be suspended in a space by an electric field consisting of a balanced AC and DC excitation signal. Particles with a selected mass-to-charge ratio have a stable oscillatory behavior, while all particles with a different mass-to-charge ratio have an unstable oscillatory trajectory and will escape from the space inside the quadrupole filter 50. Thus, only ions entering the quadrupole filter 50 with the selected mass-to-charge ratio will pass all the way through the quadrupole filter 50 to be detected by a sensing mechanism such as a conventional sensor 64. Thus, by applying the proper voltages and frequencies to the rods 52, 54, 56 and 58, the quadrupole filter 50 operates as a selective filter permitting ions of only a particular mass-to-charge ratio to pass to the sensor 64.

The co-axial arrangement of the filament 32, the field of magnet 34, and the extractor plate 48 is with reference to the axis 60. In other words, the filament, the magnetic field, and the extractor plate, and the general flow path of the ions and electrons from the ionization chamber to the and through the filter chamber is along the axis 60.

The resolution of the quadrupole filter 50 is determined by the ratio between the AC and DC components of the excitation signal. The excitation signal is generated by excitation means 66 which are conventional components to create a signal with varying AC and DC components. The quadrupole filter 50 is adjusted by tuning the amplitude of the AC and DC components of the excitation signal such that only ions with a desired mass-to-charge ratio have a stable trajectory through the quadrupole filter 50. In this way, the quadrupole filter 50 can be tuned for a wide range of mass-to-charge ratios. Preferably, a mass range of 2 to 200 amu is detectable by the mass spectrometer 10 since this range includes all of the important gases to be analyzed in medical applications.

Preferably, the quadrupole filter 50 used in the mass spectrometer 10 incorporates a delayed DC ramp. Only an AC component is applied to a short section 68 of the rods 52, 54, 56 and 58 at the front end 70 of the quadrupole filter 50 thus resulting in a stable trajectory for all ions. The remainder section 72 of the rods 52, 54, 56 and 58 have an excitation signal applied to it with an AC and a DC component. The delayed DC ramp functions as a pre-focusing element by having less discrimination at the front end 70 of the quadrupole filter 50 and allowing a wider range of ions to be focused in the remainder section 72 of the quadrupole filter 50.

As the ion beam with electrons passes into the filter chamber 46, a specific excitation signal is applied to the rods 52, 54, 56 and 58 so that only specific ions of a particular constituent of the sample gas are allowed to pass through the quadrupole filter 50. The remainder of the ions (unselected ions) follow an unstable trajectory and do not pass through the quadrupole to the sensor 64.

As the selected ions travel in a stable trajectory through the quadrupole filter 50, they pass through a focus plate 74 which focuses the ion beam. The focused ion beam then strikes the sensor 64 which measures the ion current passing through the quadrupole filter 50. The output of the sensor 64, which is proportional to the percentage of the selected molecule that is present in the gas sample, is amplified by a solid state electrometer 76 then further amplified by a programmable gain amplifier (PGA) 78 to provide the best possible system signal-to-noise ratio. The signal is then sent to an analyzing means, such as a computer 80, that functions as a data collection and analysis system for handling gas concentration data. The computer 80 calculates the proportion of the selected ion in the gas sample based upon the signal from the sensor 64.

The ion migration into the filter chamber 64 and the basic operation of the quadrupole filter 50 relative to those ions as described to this point is substantially conventional. Referring back to the unselected ions and the basic phenomena upon which the quadrupole filter 50 operates, it is the unselected ions which create the problem of the interference with the fields created by the quadrupole filter 50. The unselected ions remain in the area of the filter and come in contact with the elements of the filter, for example the quadrupole rods. In normal operation, these ions will take on electrons from the elements, the electrons neutralizing the ions which can then migrate out of the filter under the influence of and through the ion pump. Under extended operation, these ions will have a tendency to build up on the filter elements preventing later generated ions to contact the filter elements such that they will be capable of extracting electrons from those elements. The electrons build up a film on the filter elements, the film is in the nature of a dielectric and basically insulate the ions from the filter rods/elements. Thus, the ions will not be neutralized, the film with the ions will take on a charge of its own and interfere with the operation of the filter, i.e., the sensitivity and stability is thereby eroded. In present practice the mass spectrometer must then be disassembled and the film removed either by mechanical means or chemical treatment. This is undesirable as it is not only costly but it defeats the basic intention of having the mass spectrometer operate on a continuous basis over an extended period of time.

To solve this problem, the bias on the extractor plate 48 is selected so that a preselected amount of electrons is allowed to pass with the ions into the filter chamber 46. Because of the magnet 34 and the arrangement of filament 32 as described above relative to axis 60, a general direction of electron migration or flow toward and into the filter and toward the sensor will occur generally along the axis 60. This general direction of electron flow may be enhanced by an additional magnet 82. These electrons in the filter chamber combine with the ions other than those having the pre-selected mass-to-charge ratio and in the area of the quadrupole filter 50, i.e., on the filter elements as described above, so that the negatively charged electrons can combine with and, thus, neutralize the positive ions. These neutralized ions will eventually leave the filter under the influence of the ion pump and will not interfere with the performance of the quadrupole filter 50. Another magnet 84 is present at the far end 86 of the filter chamber 46 to remove any stray electrons that did not combine with the unselected ions so that those electrons do not interfere in the sensing and analysis of those selected ions by the mass spectrometer 10.

By allowing electrons to flow into the quadrupole filter 50, the electrons are able to neutralize the unselected positive ions and maintain the sensitivity and the stability of the quadrupole filter 50 to measure respiratory gases over long periods of time. This is accomplished without the necessity for disassembling the mass spectrometer 10, a cost and operational saving for the user.

In general terms and viewed in the context of the flow patterns in the mass spectrometer 10, a controlled amount of sample enters through the inlet passage 14 and is ionized in the ionization chamber 26. The ions are thus generated upstream of the quadrupole filter 50. A proportion of the ions and electrons migrate through the extractor plate 48 and are accelerated into the filter chamber 46, an area of influence of the quadrupole filter 50. The quadrupole filter 50 accomplishes the selection of the pre-selected ions which are intended to proceed through the filter 50 to the sensor 64 and generate an appropriate signal to determine the components of the gas sample. The pre-selected ions migrate in the nature of a stream from the ionization chamber 26 to the sensor 64. In the area of the quadrupole filter 50, the unselected ions, based on a mass-to-charge ratio criteria, separate from that migration or stream and migrate to the elements of the filter, the filter rods for example. The electrons in the filter chamber 46 are removed from the stream and are caused to remain in the area of the quadrupole filter 50 and thus migrate to the unselected ions on the filter elements. The electrons neutralize those unselected ions so that the sensitivity and operational integrity of unit of the quadrupole filter 50 is maintained on a continuous basis and without any external intervention such as disassembly of the mass spectrometer 10 to any degree. Any electrons which did not combine with any ions are collected by a magnet 84 so that such electrons do not interfere with the sensor 64. The quadrupole filter and the mass spectrometer in general have a longitudinal axis (60) and the generation of ions (the filament 32) and the general direction of flow of the ions and electrons (the extractor plate 48) is along that longitudinal axis.

Methods are also provided by the invention for analyzing a gas sample in a mass spectrometer and for neutralizing a mass spectrometer filter of undesired ions.

We claim:

1. A mass spectrometer system comprising:
- means for creating an internal vacuum within said mass spectrometer;
- an ionization chamber;
- an inlet passage through which a gas sample is introduced into said ionization chamber;
- valve means associated with said inlet passage for controlling the volume of gas sample introduced into said ionization chamber;
- a filament for introducing electrons into said ionization chamber whereby the electrons bombard the gas sample thus forming ions;
- an extractor plate positioned adjacent said ionization chamber and biased such that a proportion of ions and electrons are allowed to pass through said extractor plate;
- a quadrupole filter adjacent said extractor plate and into which the ions and electrons are directed by said extractor plate, said quadrupole filter is operative to permit a stream of ions with a pre-selected mass-to-charge ratio to pass through said filter and ions other than those having the preselected mass-to-charge ratio being separated from the stream of ions;
- means for directing electrons toward ions other than those having the pre-selected mass-to-charge ratio in the area of said quadrupole filter so that the electrons combine with the ions;

a sensor for detecting the stream of ions passing through said quadrupole filter; and analyzing means connected with said sensor for analyzing the components of the gas sample.

2. A mass spectrometer system as set forth in claim 1 and further comprising a magnet adjacent said quadrupole filter to collect electrons that did not combine with any ion.

3. A mass spectrometer system as set forth in claim 1 and further comprising a second magnet operative to produce a magnetic field within said ionization chamber, the magnetic field serves to focus electrons into a beam within said ionization chamber.

4. A mass spectrometer system as set forth in claim 1 and further comprising a separator plate operative to focus the stream of ions passing through said quadrupole filter onto said sensor.

5. A mass spectrometer system as set forth in claim 1 wherein said ionization chamber has a first orifice and a second orifice and wherein said extractor plate is positioned adjacent said second orifice.

6. A mass spectrometer system as set forth in claim 5 and further comprising:

a collector positioned adjacent said first orifice, said collector operative to collect ions leaving said ionization chamber through said first orifice and also operative to develop an input signal indicative of the collected ions and which in turn is indicative of the pressure within said ionization chamber; and inlet control means responsive to said input signal for manipulating said valve means to maintain a constant pressure within said ionization chamber.

7. A mass spectrometer system as set forth in claim 6 wherein said valve means includes a needle valve positioned adjacent to and movable relative to said inlet passage to control the effective opening of said inlet passage, and a piezoelectric crystal coupled to said needle valve so that the position of said needle valve is controlled by the amount of flexing of said piezoelectric crystal.

8. A mass spectrometer system as set forth in claim 7 wherein said inlet control means manipulates said valve means by producing an output signal that is coupled to said piezoelectric crystal to control the amount of flexing of said piezoelectric crystal.

9. A mass spectrometer system as set forth in claim 8 wherein said output signal is a triangular wave modulated signal.

10. A mass spectrometer system as set forth in claim 1 wherein said extractor plate is biased on the order of 2–4 volts more negative than the potential on said filament.

11. A mass spectrometer system as set forth in claim 10 wherein the potential on said filament is approximately −50 volts and the potential on said extractor plate is approximately −52.5 volts.

12. A mass spectrometer system as set forth in claim 1 and further comprising excitation means for providing an excitation signal to said quadrupole filter, wherein said quadrupole filter has a first portion and a second portion, wherein said excitation means provides an excitation signal to said first portion including only an AC component and an excitation signal to said second portion that includes an AC and a DC component.

13. A mass spectrometer system as set forth in claim 1 wherein said quadrupole filter has a longitudinal axis and said filament, said extractor plate, and the general direction of the ions and electrons from said ionization into and through said quadrupole filter is generally along said longitudinal axis.

14. An mass spectrometer system comprising:

an ion pump for creating a vacuum within said mass spectrometer;

an ionization chamber with a first and a second orifice;

an inlet passage through which a gas sample is introduced into said ionization chamber;

valve means associated with the inlet passage for controlling the volume of gas sample introduced into said ionization chamber;

a filament for introducing electrons into said ionization chamber via the first orifice whereby the electrons bombard the gas sample thus forming ions;

a first magnet positioned for producing a magnetic field within said ionization chamber which serves to focus the electrons into a beam within said ionization chamber;

a collector positioned adjacent said first orifice, said collector being biased more negative than said filament such that said collector is operative to focus the electrons emitted from said filament and further operative to collect ions leaving said ionization chamber via said first orifice;

a filter chamber;

an extractor plate adjacent said second orifice of said ionization chamber, said extractor plate being biased such that a proportion of ions and electrons in said ionization chamber are allowed to pass into said filter chamber;

a quadrupole filter in said filter chamber through which the emitted ions and electrons are directed by said extractor plate, said quadrupole filter allows ions of only a selected mass-to-charge ratio to pass through said quadrupole filter;

a second magnet for attracting electrons toward the ions other than those having the selected mass-to-charge ratio in the area of said quadrupole filter so that the electrons combine with the ions;

a third magnet for collecting electrons that did not combine with any ion in the area of said quadrupole filter;

a separator plate for focusing the ions of the selected mass-to-charge ratio after the ions have passed through said quadrupole filter;

a sensor for receiving the ions that have been focused by said separator plate; and analyzing means connected with said sensor for analyzing the components of the gas sample.

15. A mass spectrometer system as set forth in claim 14 wherein said collector develops an input signal indicative of the collected ions and which in turn is indicative of the pressure within said ionization chamber and further comprising an inlet control means responsive to said input signal for manipulating said valve means to maintain a constant pressure within said ionization chamber.

16. A mass spectrometer system as set forth in claim 15 wherein said valve means includes a needle valve, one end of which is tapered and positionally adjustable adjacent to said inlet passage to control the effective opening thereof, and a piezoelectric crystal coupled to said needle valve so that the position of said needle valve is controlled by the amount of flexing of said piezoelectric crystal.

17. A mass spectrometer system as set forth in claim 16 wherein said inlet control means manipulates said valve means by producing an output signal that is coupled to said piezoelectric crystal to control the amount of flexing of said piezoelectric crystal.

18. A mass spectrometer system as set forth in claim 16 wherein said output signal is a triangular wave modulated signal.

19. A mass spectrometer system as set forth in claim 14 wherein said extractor plate is biased on the order of 5% of the potential on said filament.

20. A mass spectrometer system as set forth in claim 14 and further comprising means for providing an excitation signal to said quadrupole filter, wherein said quadrupole filter has a first portion and a second portion, wherein said providing means provides an excitation signal to said first portion including only an AC component and an excitation signal to said second portion that includes an AC and a DC component.

21. A mass spectrometer system as set forth in claim 14 wherein said quadrupole filter has a longitudinal axis and said filament, said extractor plate, and the general direction of the ions and electrons from said ionization into and through said quadrupole filter is generally along said longitudinal axis.

22. A mass spectrometer system as set forth in claim 14 wherein said extractor plate is biased on the order of 2–4 volts more negative than the potential on said filament.

23. A mass spectrometer system as set forth in claim 22 wherein the potential on said filament is approximately −50 volts and the potential on said extractor plate is approximately −52.5 volts.

24. A mass spectrometer system comprising:

means for creating a vacuum envelope within said mass spectrometer;

an ionization chamber and means defining an inlet passage through which a gas sample is introduced into said ionization chamber;

inlet control means responsive to the pressure condition within said ionization chamber for controlling the volume of gas sample introduced into said ionization chamber;

means for introducing electrons into said ionization chamber whereby the electrons bombard the gas sample thus forming ions within said ionization chamber;

a filter chamber associated with said ionization chamber and into which a portion of ions and electrons generated in said ionization chamber are allowed to pass;

a filter apparatus in said filter chamber operative to permit a stream of ions with a pre-selected mass-to-charge ratio to pass through said filter apparatus and ions other than those having the pre-selected mass-to-charge ratio being separated from the stream of ions;

means for directing electrons toward ions other than those having the pre-selected mass-to-charge ratio in the area of said quadrupole filter so that the electrons combine with the ions; and means for sensing the ions passing through said filter apparatus and operative to generate a signal corresponding to the ion condition thereby detected.

25. A method of analyzing a gas sample in a mass spectrometer comprising the steps of:

ionizing a gas sample in an ionization chamber by bombardment of said gas sample by electrons;

migrating the ions from said ionization chamber toward a sensing mechanism;

separating the ions on the basis of their mass-to-charge ratio prior to arrival of the ions at said sensing mechanism to allow only ions of a preselected mass-to-charge ratio to migrate to said sensing mechanism;

calculating the proportion of the ions with the preselected mass-to-charge ratio in the gas sample based upon the amount ions that migrate to said sensing mechanism;

migrating electrons along with said ions from said ionization chamber toward said sensing mechanism; and neutralizing the ions other than those of said preselected mass-to-charge ratio by allowing the electrons to combine with said ions prior to said sensing mechanism so that the sensitivity and operational integrity of the gas sample analysis is maintained on a continuous basis.

26. The method of analyzing a gas sample of claim 25 and further comprising the step of creating an electric bias downstream of said ionization chamber and upstream of said sensing mechanism to influence said migration of ions and electrons.

27. The method of analyzing a gas sample of claim 25 and further comprising the step of migrating a portion of the generated ions in the ionization chamber to a valve and inlet control system to control the amount of gas sample being introduced for ionization in the ionization chamber.

28. The method of analyzing a gas sample of claim 25 and further comprising the step of removing electrons downstream of separation of ions on the basis of mass-to charge ratio and upstream of the sensing mechanism.

29. The method of analyzing a gas sample of claim 25 further comprising producing the general direction of the migration of ions and electrons from said ionization chamber into and through said separation generally along a longitudinal axis and toward sensing mechanism.

30. A method of neutralizing a mass spectrometer filter of undesired ions comprising the steps of:

introducing electrons into an ionization chamber;

creating an electric bias downstream of said ionization chamber to influence migration of said electrons into a filter chamber; and focusing the electrons toward the undesired ions in said filter chamber to be neutralized thereby allowing the electrons to combine with the ions thus neutralizing the ions.

31. A method of neutralizing a mass spectrometer filter of undesired ions of claim 30 and further comprising the step of removing electrons that do not combine with any ions.

* * * * *